United States Patent
Foulkes

(10) Patent No.: US 11,303,513 B2
(45) Date of Patent: *Apr. 12, 2022

(54) AUTOMATIC QOS OPTIMIZATION IN NETWORK EQUIPMENT

(71) Applicant: EVENROUTE, LLC, Big Canoe, GA (US)

(72) Inventor: Jonathan Foulkes, Big Canoe, GA (US)

(73) Assignee: Evenroute, LLC, Big Canoe, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/274,384

(22) Filed: Sep. 23, 2016

(65) Prior Publication Data
US 2017/0093630 A1    Mar. 30, 2017

Related U.S. Application Data

(60) Provisional application No. 62/233,465, filed on Sep. 28, 2015.

(51) Int. Cl.
*H04L 41/0816* (2022.01)
*H04L 41/083* (2022.01)
(Continued)

(52) U.S. Cl.
CPC ........ *H04L 41/0816* (2013.01); *H04L 41/083* (2013.01); *H04L 41/0893* (2013.01);
(Continued)

(58) Field of Classification Search
CPC . H04L 41/0186; H04L 41/083; H04L 67/322; H04L 41/0893; H04L 41/5009; H04L 41/5025
(Continued)

(56) References Cited

U.S. PATENT DOCUMENTS

| 6,078,953 A | 6/2000 | Vaid et al. |
| 7,567,539 B2 | 7/2009 | Fujiwara et al. |

(Continued)

FOREIGN PATENT DOCUMENTS

| WO | 2015066728 | 5/2015 |
| WO | 2017058657 | 4/2017 |
| WO | 2018231693 | 12/2018 |

OTHER PUBLICATIONS

OpenWrt Wiki, "Smart Queue Management (SQM)—Minimizing Bufferbloat," accessed at https://wiki.openwrt.org/doc/howto/sqm, Created Apr. 28, 2015, Accessed Sep. 22, 2016, 5 pgs.
(Continued)

*Primary Examiner* — David R Lazaro
*Assistant Examiner* — Zia Khurshid
(74) *Attorney, Agent, or Firm* — Taylor English Duma LLP

(57) ABSTRACT

Systems, methods, and software for automatically optimizing QoS configuration in networking equipment. A network device determines performance measurements for a network connection of the network device. The performance measurements are sent by the network device to a web service over the network connection, where the web service computes configuration settings for the network device based on the performance measurements. The web service returns the computed configuration settings to the network device, and the network device applies the computed configuration settings to the QoS functions of the network device.

17 Claims, 5 Drawing Sheets

(51) Int. Cl.
*H04L 67/61* (2022.01)
*H04L 41/0893* (2022.01)
*H04L 41/5009* (2022.01)
*H04L 41/5025* (2022.01)
*H04L 43/08* (2022.01)
*H04L 41/0266* (2022.01)
*H04L 67/01* (2022.01)

(52) U.S. Cl.
CPC ...... *H04L 41/5009* (2013.01); *H04L 41/5025* (2013.01); *H04L 43/08* (2013.01); *H04L 67/322* (2013.01); *H04L 41/0266* (2013.01); *H04L 67/42* (2013.01)

(58) Field of Classification Search
USPC .......................................................... 709/220
See application file for complete search history.

(56) References Cited

U.S. PATENT DOCUMENTS

| | | | |
|---|---|---|---|
| 7,596,373 | B2 | 9/2009 | McGregor et al. |
| 7,653,005 | B2 | 1/2010 | Zou et al. |
| 7,684,332 | B2 | 3/2010 | Ray et al. |
| 8,139,606 | B2 | 3/2012 | Bekele et al. |
| 8,266,477 | B2 | 9/2012 | Mankovskii et al. |
| 8,335,163 | B2 | 12/2012 | Li et al. |
| 8,474,000 | B2 | 6/2013 | Patti et al. |
| 8,630,190 | B2 | 1/2014 | Goyal et al. |
| 8,650,294 | B2 | 2/2014 | Thyni |
| 9,054,966 | B2 | 6/2015 | Thyni |
| 9,722,887 | B2 | 8/2017 | Kakadia et al. |
| 9,769,684 | B1 | 9/2017 | Fiumano et al. |
| 9,819,610 | B1 | 11/2017 | Crump et al. |
| 10,419,580 | B2 | 9/2019 | Foulkes et al. |
| 10,938,948 | B2 | 3/2021 | Foulkes |
| 2002/0143911 | A1 | 10/2002 | Vicente et al. |
| 2004/0105415 | A1 | 6/2004 | Fujiwara et al. |
| 2005/0144594 | A1 | 6/2005 | Yamazaki |
| 2007/0005786 | A1* | 1/2007 | Kumar ................... G06F 8/656 709/230 |
| 2007/0030860 | A1 | 2/2007 | Bekele et al. |
| 2008/0049638 | A1* | 2/2008 | Ray ...................... H04L 41/0896 370/252 |
| 2011/0096675 | A1 | 4/2011 | Li et al. |
| 2012/0047547 | A1 | 2/2012 | Patti et al. |
| 2012/0236713 | A1 | 9/2012 | Kakadia et al. |
| 2013/0094356 | A1* | 4/2013 | Keith ...................... H04L 47/22 370/229 |
| 2013/0159518 | A1 | 6/2013 | Curcio et al. |
| 2013/0326047 | A1 | 12/2013 | Easty |
| 2014/0082162 | A1 | 3/2014 | Thyni |
| 2014/0281023 | A1 | 9/2014 | Apte |
| 2014/0035543 | A1 | 12/2014 | Kakadia |
| 2014/0355439 | A1 | 12/2014 | Kakadia |
| 2015/0012634 | A1* | 1/2015 | Zhu ...................... H04L 67/303 709/223 |
| 2015/0106166 | A1 | 4/2015 | Gutierrez |
| 2015/0365309 | A1 | 12/2015 | Kaminski et al. |
| 2016/0080280 | A1* | 3/2016 | Ramachandran ..... G06F 16/285 370/235 |
| 2016/0248683 | A1* | 8/2016 | Knight ................ H04L 43/0888 |
| 2016/0285752 | A1* | 9/2016 | Joshi ..................... H04L 45/302 |
| 2016/0380823 | A1* | 12/2016 | Shen ................... H04L 12/4633 370/254 |
| 2017/0279921 | A1 | 9/2017 | Foulkes et al. |
| 2020/0007652 | A1 | 1/2020 | Foulkes et al. |

OTHER PUBLICATIONS

Foulkes, Jonathan; International Search Report and Written Opinion for PCT Application No. PCT/US2016/053401, filed Sep. 23, 2016, dated Dec. 8, 2016, 11 pgs.

Apostolopoulos, et al.; Article entitled: "Quality of service based routing: a performance perspective"; Proceedings of the ACM SIGCOMM '98; 17-18, 1998. [retrieved on Nov. 10, 2016]. Retrieved from the Internet, 13 pgs.

Chen, et al.; Article entitled: "Distributed Quality-of-Service Routing in Ad Hoc Networks", IEEE Journal on Selected Areas in Communications; vol. 17, Iss. 8; 1488-1505, 1999. [retrieved on Nov. 10, 2016]. Retrieved from the Internet, 20 pgs.

Foulkes, Jonathan; International Preliminary Report on Patentability for application No. PCT/US2016/053401, filed Sep. 23, 2016, dated Apr. 12, 2018, 9 pgs.

Foulkes, Jonathan; International Search Report and Written Opinion for PCT Application No. PCT/US18/36862, filed Jun. 11, 2018, dated Aug. 29, 2018, 7 pgs.

Foulkes, Jonathan; Non-Final Office for U.S. Appl. No. 15/619,949, filed Jun. 12, 2017, dated Jun. 20, 2019, 24 pgs.

Foulkes, Jonathan; Notice of Allowance for U.S. Appl. No. 15/619,949, filed Jun. 12, 2017, mailed Jul. 23, 2019, 11 pgs.

Foulkes, Jonathan; Extended European Search Report for serial No. 16852344.7, filed Sep. 23, 2016, dated Mar. 26, 2019, 11 pgs.

Foulkes, Jonathan; International Preliminary Report on Patentability for PCT Application No. PCT/US18/36862, filed Jun. 11, 2018, dated Dec. 17, 2019, 6 pgs.

Foulkes, Jonathan; Office Action for European application No. 16852344.7, filed Sep. 23, 2016, dated Apr. 1, 2021, 8 pgs.

Foulkes, Jonathan; Non-Final Office Action for U.S. Appl. No. 16/558,365, filed Sep. 3, 2019, dated Oct. 27, 2020, 18 pgs.

Foulkes, Jonathan; Notice of Allowance for U .S U.S. Appl. No. 16/558,365, filed Sep. 3, 2019, dated Nov. 30, 2020, 11 pgs.

Foulkes, Jonathan; Second Supplemental Notice of Allowance for U.S. Appl. No. 16/558,365, filed Sep. 3, 2019, dated Feb. 2, 2021, 6 pgs.

Foulkes, Jonathan; Supplemental Notice of Allowance for U.S. Appl. No. 16/558,365, filed Sep. 3, 2019, dated Jan. 8, 2021, 6 pgs.

Foukles, Jonathan; Office Action for Mexico Patent application No. MX/a/2018/003863, filed Sep. 23, 2016, dated Oct. 9, 2020, 8 pgs.

Foulkes, Jonathan; Office Action for serial No. 16852344.7, filed Sep. 23, 2016, dated Jul. 24, 2020, 7 pgs.

Foulkes, Jonathan; Extended European Search Report for application No. 18818496.4, filed Jun. 11, 2018, dated Jan. 18, 2021, 8 pgs.

Foulkes, Jonathan; Third Party Observations for European application No. 16852344.7, filed Sep. 23, 2016, dated Jan. 3, 2022, 3 pgs.

Foulkes, Jonathan; Office Action for European application No. 18818496.4, filed Jun. 11, 2018, dated Nov. 4, 2021, 6 pgs.

* cited by examiner

AUTOMATIC QOS OPTIMIZATION IN NETWORK EQUIPMENT

CROSS-REFERENCE TO RELATED APPLICATIONS

This application claims the benefit of U.S. Provisional Application No. 62/233,465, filed Sep. 28, 2015, entitled "Method for automatic setting and optimization of Quality of Service properties in network equipment," the entire disclosure of which is hereby incorporated herein by this reference.

BACKGROUND

Conventional networking equipment, such as routers, access points, gateways, switches, and the like, generally attempt to ensure that end user traffic is propagated and managed in such a way as to decrease re-transmissions and minimize lag or latency. However, due to an ever-decreasing cost of memory, networking equipment has evolved to include large buffers at every stage of the transmission path. This has led to a phenomenon known as "bufferbloat," in which downstream equipment sends data to upstream equipment as fast as it will receive it, with no concern for the true end-to-end actual throughput capacity of the connection. This may result in congestion (or "bloat") as the upstream equipment fails to send along all the buffered data in a timely manner, causing packets to become queued in buffers for too long. In a first-in-first-out queuing system, overly large buffers result in longer queues and higher latency, but do not improve network throughput and may even reduce throughput to zero in extreme cases.

To help combat this problem, many different traffic management algorithms have been developed to increase the Quality of Service ("QoS") provided by certain key networking equipment, such as routers. However, to be effective, these QoS algorithms need very precise configuration. This configuration can become quite complex due to multiple factors that must be taken into account, such as the type of connectivity and associated protocol overhead (e.g. PPPoE on DSL) and the actual network link throughput between the network gear and the ultimate destination, measured in both directions. Generally, QoS algorithms are designed to manage the packet flow at times of link saturation. Knowing exactly when and where the saturation points occur is also important to optimal configuration. Furthermore, these saturation points can change over the course of the day/week depending on upstream networking issues, such as overloaded ISP backhauls during the evening when the majority of users are making heavy use of the network.

It is with respect to these and other considerations that the disclosure made herein is presented.

SUMMARY

The present disclosure relates to systems, methods, and software for automatically optimizing QoS configuration in networking equipment. An exemplary method of optimizing QoS configuration in a network device includes determining performance measurements for a network connection of the network device. The performance measurements are sent by the network device to a web service over the network connection where the web service computes configuration settings for the network device based on the performance measurements. The web service returns the computed configuration settings to the network device, and the network device applies the computed configuration settings to the QoS functions of the network device.

In further embodiments, an exemplary computer-readable storage medium comprises processor-executable instructions that, when executed by a processing resource of a network device, cause the network device to communicate with a performance testing service over a network to measure performance measurements for a connection to the network. The performance measurements are then sent to a web service over the network, wherein the web service computes configuration settings for the network device based on the performance measurements for the connection. The network device receives the computed configuration settings from the web service over the network and applies the computed configuration settings to QoS functions of the network device.

In further embodiments, an exemplary system comprises at least one performance testing service executing on a network, a network router operably connected to the network by a network connection, and a web service executing on the network. The network router comprises a firmware, QoS functions, and an optimization control module. The optimization control module is configured to determine performance measurements for the network connection utilizing the at least one performance testing service, send the performance measurements to a web service over the network, receive one or more configuration commands from the web service related to configuration settings for the QoS functions, and execute the one or more configuration commands to configure the QoS functions of the network router. The web service is configured to receive the performance measurements from the network router, compute the configuration settings for the network router based on the received performance measurements, and return the configuration commands related to the configuration settings to the network router.

Various embodiments and implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The present disclosure describes systems, methods, and software for automatically optimizing QoS configuration in networking equipment. Utilizing the technologies described herein, the core network quality issues induced by bufferbloat may be remedied by ensuring that a well-configured, effective QoS process is applied to network links in a totally automatic and transparent way as soon as new networking equipment is deployed on the network. In addition, the benefits of ongoing QoS property refinements over time may be achieved, whether manually or automatically initiated. By providing the network characterization task as a function of the network equipment itself, the vagaries of end user computing devices, the associated software, and the specific network does not influence the accuracy of measuring the link saturation points and the bufferbloat metrics. Once the metrics are collected, the embodiments described herein provide a series of functions that take these metrics and other relevant network device configuration information and calculate highly optimized QoS configuration properties, which are then automatically applied to the QoS service on the networking equipment.

According to further embodiments, link and bufferbloat metrics may be re-measured over time so as to enable the networking equipment to operate in the most optimal form and provide the highest quality of service possible in the circumstances. Bufferbloat metrics are typically based on calculating the differential in response latencies between quiescent network state and saturated network state. By applying analytics to the metrics collected over time, target QoS properties can be calculated for determined times of day so as to track forecasted changes in link saturation points. These new properties may then be applied to the QoS service at the determined times to ensure optimum performance. Accordingly, the embodiments described provide end users and their devices with a highly optimized network quality that enables smooth, reliable operation, even on saturated network links.

Figure 1:
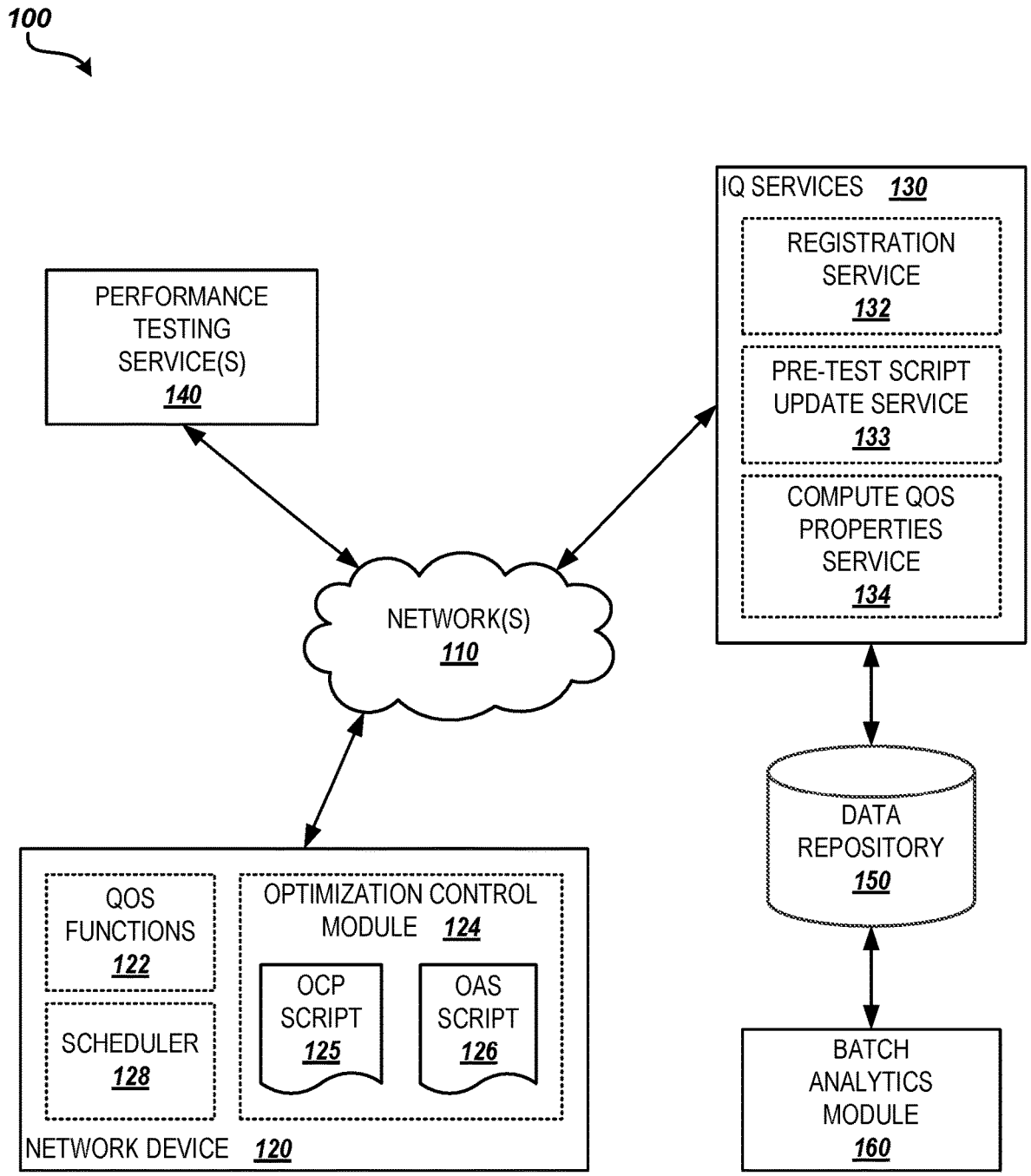
FIG. 1 is a block diagram of an illustrative configuration optimization system for automatically optimizing QoS configuration in networking equipment, according to some embodiments of the present disclosure.

FIG. 1 is a block diagram of an illustrative configuration optimization system 100 according to various embodiments of the present disclosure. The configuration optimization system 100 includes a network device 120. According to embodiments, the network device 120 represents any type of networking equipment that has network traffic management responsibilities on or between one or more networks 110. In some embodiments, the network(s) 110 may represent local area networks (LANs), wide area network (WANs), and/or other data, communication, or telecommunication networks that collectively make up the Internet. In further embodiments, any network(s) 110 that support the TCP/IP protocol may be utilized. For example, the network device 120 may represent an Internet router designed for a small office or home office ("SOHO") environment based on popular system-on-chip ("SOC") hardware implementations. In further embodiments, the network device 120 may represent an enterprise gateway, a wireless access point, a smart network switch, or the like.

According to embodiments, the network device 120 includes a firmware (not shown) that controls the operation and network traffic management functions of the device. In some embodiments, the firmware may include a derivation of common open-source networking platforms, such as OpenWRT®, upon which extensions are implemented to incorporate the functionality described herein. For example, extensions may be implemented by any combination of firmware code modifications, additional software modules, shell scripts, and the like. The firmware may include QoS functions 122 that allow the network device 120 to manage network traffic with a variety of QoS algorithms known in the art. The firmware may further include a scheduler 128 for running configuration, maintenance, and other processes at defined times and frequencies, such as the cron scheduler included in the OpenWRT® Linux distribution.

The network device 120 may also include an optimization control module 124. The optimization control module 124 may represent software, firmware, or firmware extensions on the network device 120 to control the processes described herein for automatically configuring and optimizing the QoS functions 122 or device configuration settings. In some embodiments, the optimization control module 124 may include one or more shell scripts, such as an optimization control process script 125 and an optimization adjustment script 126 which perform the functions and processes described herein. For example, the optimization control process script 125 and/or optimization adjustment script 126 may perform the method 300 described herein for automatically optimizing QoS configuration in networking equipment, according to some embodiments. The optimization control module 124 may further leverage the scheduler 128 for scheduling periodic, recurring invocations of these and other scripts.

According to further embodiments, the configuration optimization system 100 also includes IQ services 130 that provide supporting functions to the optimization control module 124 on the network device 120 for automatically optimizing the configuration of the QoS functions 122 of the network device, as described herein. The IQ services 130 may include a number of Web services or other network services executing on one or more server computers available to the network device 120 across the network(s) 110. The network device 120 may access the IQ services 130 via any number of service calling protocols known in the art, including REST, SOAP, WSDL, HTTP, FTP, and/or any combination of these and other service calling protocols. In some embodiments, the IQ services 130 may be hosted by one or more third-party cloud platform providers, such as AMAZON WEB SERVICES™ ("AWS") from Amazon Web Services, Inc.

In some embodiments, the IQ services 130 may include a registration service 132 allowing the network device to register with the IQ services and obtain security credentials for subsequent service calls. In some embodiments, the registration service 132 may provide an application program interface ("API") for registration calls from the optimization control module 124, such as the following:

Input:
reg mac address of network device 120
Output:
username, password

In further embodiments, the IQ services 130 may include a pre-test component update service 133 that allows the network device 120 to update its firmware, extensions, and/or shell scripts before performing the functions described herein for automatically optimizing the configuration of the QoS functions 122 of the network device. For example, the pre-test component update service 133 may provide an API for script update calls from the optimization control module 124, such as the following:

Input: (supply only one)
   firmware version
   IQtest version
Output:
   url to update file(s) on server (NULL if no update)

In further embodiments, the IQ services 130 includes a compute QoS properties service 134, also referred to herein as the "CQP service 134," that provides various services to the network device 120 for receiving network test results, calculating and returning QoS configuration settings, determining optimality of the QoS configuration, logging results, and the like. For example, the CQP service 134 may provide an API for the optimization control module 124 to retrieve QoS configuration settings based on performance measurements of the connection of the network device 120 to the network(s) 110, such as latency, line speed (up and down), and the like, in addition to other properties of the connection, such as connection type, (DSL, VDSL, cable, etc.), connection protocol (PPPoE, DHCP, etc.), and the like. In some embodiments, the CQP service 134 may provide a calculate QoS API comprising the following:

Input:
   sqm cps
   modem dsl, vdsl, cable
   upload line upload in kbit/s
   download line download in kbit/s
Output:
   upload QoS value, download QoS value The CQP service 134 may further provide an API for the optimization control module 124 to retrieve a rating calculated for the configured QoS functions 122 of the network device 120 based on performance measurements from the network. This rating is also referred to herein as the "IQ rating." For example, the optimization control module 124 may call the calculate IQ rating API after an initial round of configuration and testing are complete, as described herein. The CQP service 134 and/or optimization control module 124 may also determine whether additional optimization is required based on the IQ rating, as further described below. The calculate IQ rating API may comprise the following:

Input:
   calc bloat
   modem dsl, vdsl, cable
   baseline baseline latency in ms
   latency latency at load in ms
   qosdownload qosdownload in kbit/s
   qosupload qosupload in kbit/s
   actualupload actual upload in kbit/s
   actualdownload actual donwload in kbit/s
   lastbloatvalue 0-5
   tuning true, false
Output:
   grade, optimizingspeedresponse, revertresponse, newspeed According to some embodiments, the "grade" value in the output indicates the IQ rating value, while the "optimizingspeedresponse" value indicates when final QoS settings have been calculated. The "newspeed" value may contain the final QoS settings. If final QoS settings have not been calculated, e.g. the IQ rating indicates additional optimization is necessary, then the "newspeed" value may contain adjusted QoS settings to be set before performing additional test iterations, as described below. If the recalculated QoS settings are not better than the previous QoS settings, the "revertresponse" value may indicate to the optimization control module 124 that it should revert to the previous QoS settings.

The CQP service 134 may further provide an API for the optimization control module 124 to retrieve pre-test QoS configuration settings for configuring the QoS functions 122 of the network device 120 prior to executing testing functions, as described herein. According to some embodiments, the CQP service 134 may return QoS or other configuration settings as a series of standard configuration commands to be executed by the firmware of the network device 120 in order to configure the corresponding functions. For example, the CQP service 134 may return a series of commands based on the Unified Configuration Interface ("UCI") implemented in OpenWRT®. The retrieve pre-test QoS configuration API may comprise the following:

Input:
   sqm pre
   proto dhcp, pppoe
Output:
   uci cmd 1, uci cmd 2, . . . uci cmd n Similarly, the CQP service 134 may provide an API for the optimization control module 124 to retrieve post-test QoS configuration settings after optimization for final configuration of the QoS functions 122 of the network device 120. The API may further save provided tuning metrics for storage for future batch analytics, as described below. The retrieve post-test QoS configuration API may comprise the following:

Input:
   sqm post
   modem dsl, vdsl, cable
   proto dhcp, pppoe
   qosupload qosupload in kbit/s
   qosdownload qosdownload in kbit/s
   bloatup A+, A, B, C, D, F
   bloatdown A+, A, B, C, D, F
   actualupload actual upload in kbit/s
   actualdownload actual download in kbit/s
   timestamp device timestamp
Output:
   uci cmd, uci cmd 2, uci cmd n The CQP service 134 may further provide an API for the optimization control module 124 to upload tuning metrics captured during initial setup of the network device 120 to help optimize the QoS functions 122 and/or device configuration settings of the device, as described herein. The uploaded tuning metrics and calculated QoS values, along with the day and time they are determined, may be used to generate optimization schedules as well as create predictive schedules around this day/time period. The post tuning metrics API may comprise the following:

Input:
   sqm post
   modem dsl, vdsl, cable
   proto dhcp, pppoe
   qosupload qosupload in kbit/s
   qosdownload qosdownload in kbit/s
   bloatup A+, A, B, C, D, F
   bloatdown A+, A, B, C, D, F
   actualupload actual upload in kbit/s
   actualdownload actual download in kbit/s
   timestamp device timestamp
Output:
   result (success or fail)

The CQP service 134 may further provide an API for the optimization control module 124 to retrieve one or more schedules for performing periodic optimization of the QoS functions 122 of the network device as well as other tuning operations. The optimization control module 124 may then apply the retrieved schedule(s) to the optimization and tuning processes through the scheduler 128 of the network device 120, according to embodiments. The retrieve tuning schedule API may comprise the following:

Input:
execute refresh schedule
Output:
schedule1, schedule2, schedulen

The CQP service 134 may further provide an API for the optimization control module 124 to upload log files from the network device 120 which may then be utilized in the optimization process, as described herein. The upload log file API may comprise the following:

Input:
logfile contents
Output:
result (success or fail)

The CQP service 134 may further provide an API for the optimization control module 124 to set test parameters to optimize correctly on low and high-bandwidth connections. The get streams API may return the number of streams to use in testing based on the type of connection of the network device 120 to the network(s) 110, the line speed of the connection, and/or the like. The get streams API may comprise the following:

Input:
streams dsl, vdsl, cable
upload line upload in kbit/s
download line download in kbit/s
Output:
number of streams According to further embodiments, the configuration optimization system 100 also includes performance testing services 140 that are available to the network device 120 across the network(s) 110 as targets for performance measuring processes performed by the optimization control module 124, as described herein. In some embodiments, the performance testing services 140 may be provided by cloud-based servers hosting instances of the netperf server process. For example, the performance testing services 140 may be hosted on Linux servers deployed via AMAZON EC2™ from Amazon Web Services, Inc.

In further embodiments, the configuration optimization system 100 also includes a data repository 150 that stores the information required for performing the processes and functions described herein. For example, the data repository 150 may store registration information for the network device 120, results of optimization processes and tuning metrics for the device, uploaded logs from the device, and the like. In some embodiments, the data repository 150 may be implemented using a cloud-based relational database, such as AMAZON RELATIONAL DATABASE SERVICE™ (RDS) from Amazon Web Services, Inc.

According to further embodiments, the configuration optimization system 100 includes a batch analytics module 160. The batch analytics module may run a series of analytical processes that utilize test results from different times of data, uploaded tuning metrics, and other data in the data repository 150 to calculate outputs such as the optimum time schedule and values for shifting the QoS properties in a given router or for a set of routers to account for changing network conditions throughout the day/week. For example, the scheduler 128 of a network device 120 may initially be configured to initiate the optimization control module 124 to perform the optimization process every T (e.g., 60) minutes for N (e.g., 14) days. The optimization process may include the upload of tuning metrics to the IQ services 130 via the retrieve post-test QoS configuration API or the post tuning metrics API of the CQP service 134 and storage of the tuning metrics in the data repository 150 by timestamp. At the end of this initial "tuning" phase, the IQ services 130 and the batch analytics module 160 may utilize the uploaded tuning metrics to compute the optimal configuration settings for the QoS functions 122 of the network device 120 for multiple (e.g., 4) periods during the day that the device should apply to achieve best results. At the end of the next optimization process, the optimization control module 124 may download a new "maintenance" schedule from the IQ services 130 so that the optimal QoS settings can be applied at the correct times of day. The IQ services 130 may also adjust the initial "tuning" and "maintenance" schedules as it sees fit if reported metrics fall outside the norms. In some embodiments, the batch analytics module 160 may be implemented as a series of scheduled processes deployed on cloud-based servers, such as Linux servers deployed via AMAZON EC2™ from Amazon Web Services, Inc.

Figure 2:
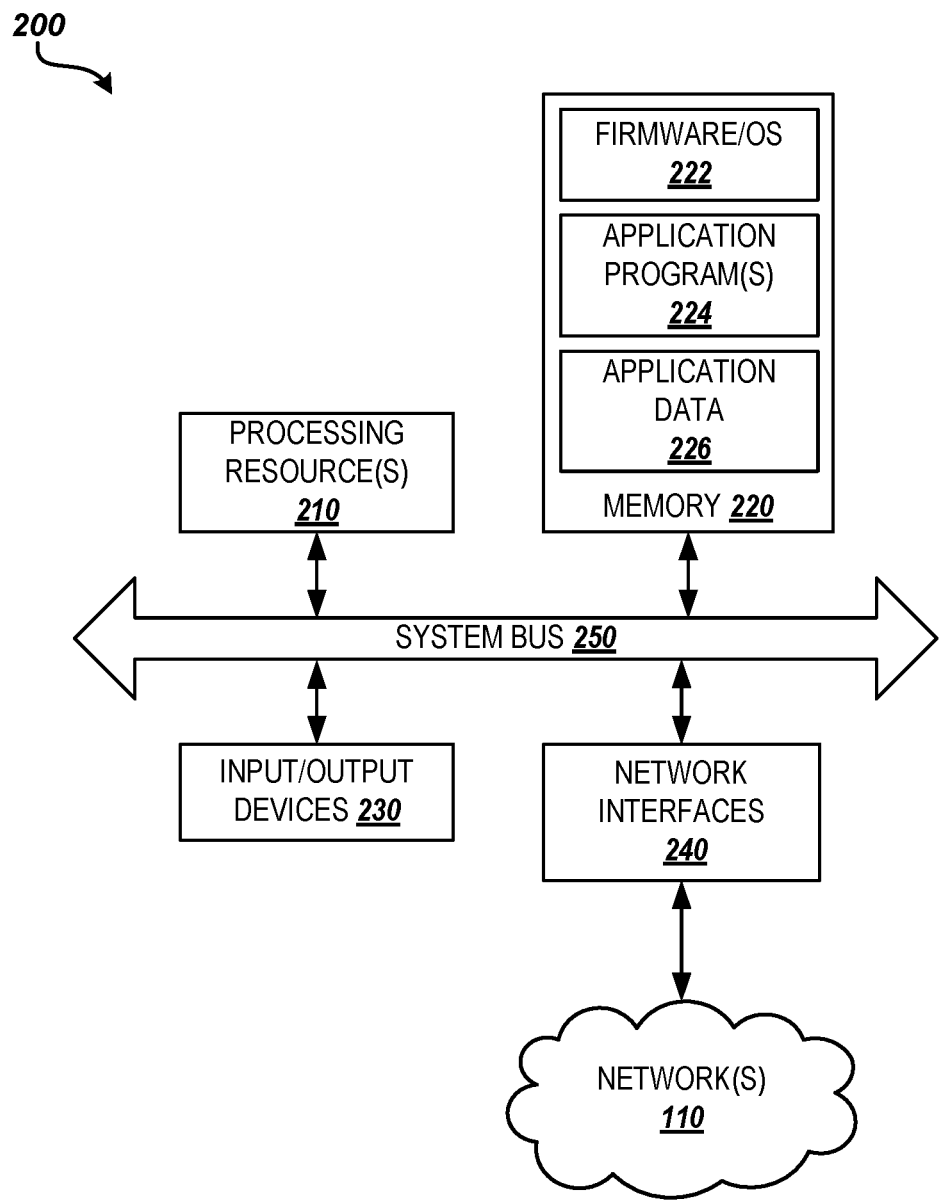
FIG. 2 is a block diagram illustrating a computer architecture for network devices, servers, and other computing devices described herein as part of the system for automatically optimizing QoS configuration in networking equipment, according to various implementations of the present disclosure.

FIG. 2 is a block diagram illustrating a computing architecture 200 for networking equipment and other computing devices utilized in the configuration optimization system 100, according to various embodiments. The computing architecture 200 may be utilized in the network device 120, cloud-based servers, or other computer systems described herein or for performing the methods described herein. As shown in this embodiment, the computing architecture 200 includes processing resource(s) 210 and a memory 220. The computing architecture 200 further includes input/output devices 230 and network interfaces 240. The components of the computing architecture 200 may be interconnected and may communicate with each other via a system bus interface 250 or other suitable communication devices.

The processing resource(s) 210 may comprise one or more general-purpose or specific-purpose processors, microcontrollers, FPGAs, and/or the like for controlling the operations and functions of the server or device. In some implementations, the processing resource(s) 210 may include a plurality of processors, computers, servers, or other processing elements for performing different functions within the computing architecture 200. The memory 220 may include any combination of volatile and non-volatile memory. For example, volatile memory may comprise random access memory ("RAM"), dynamic RAM ("DRAM"), static RAM ("SRAM"), and the like, while non-volatile memory may comprise read only memory ("ROM"), electrically erasable programmable ROM ("EEPROM"), FLASH memory, magnetic storage devices, such as a hard-disk drive ("HDD"), optical storage devices, such as a DVD-ROM drive, and the like. The memory may be configured to store any combination of information, data, instructions, software code, and the like.

According to some embodiments, the memory 220 may store a firmware and/or operating system ("OS") 222 for controlling the basic operation of the device or server. For example, the memory 220 of a network device 120 may store a firmware/OS 222 comprising the OpenWRT® Linux distribution. The memory 220 may further store application program(s) 224 and application data 226 for performing the specific processes or functions for automatically optimizing QoS configuration in networking equipment, as described herein. For example, the memory 220 of the network device 120 may store the optimization control module 124, the optimization control process script 125, the optimization adjustment script 126, and the like. In addition, the IQ services 130, batch analytics module 160, the data repository 150, and/or the like may be stored in one or more memories 220 and run on the same or different computer systems and/or servers.

In addition to the memory 220, the computing architecture 200 may include other computer-readable media storing information, data, instructions, software code, etc. It will be appreciated by those skilled in the art that computer-readable media can be any available media that may be accessed by the computing architecture 200, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, EEPROM, FLASH memory, or other solid-state memory technology, DVD-ROM, BLU-RAY or other optical storage, magnetic cassettes, magnetic tape, magnetic disk storage or other magnetic storage devices and the like. According to some embodiments, the computing architecture 200 may include computer-readable media storing processor-executable instructions that cause the processing resource(s) 210 to perform aspects of the method 300 described herein in regard to FIGS. 3A-3C.

The input/output devices 230 may include various input mechanisms and output mechanisms. For example, input mechanisms may include various data entry devices, such as keyboards, keypads, buttons, switches, touch pads, touch screens, cursor control devices, computer mice, stylus-receptive components, voice-activated mechanisms, microphones, cameras, infrared sensors, or other data entry devices. Output mechanisms may include various data output devices, such as computer monitors, display screens, touch screens, audio output devices, speakers, alarms, notification devices, lights, light emitting diodes, liquid crystal displays, printers, or other data output devices. The input/output devices 230 may also include interaction devices configured to receive input and provide output, such as dongles, touch screen devices, and other input/output devices, to enable input and/or output communication.

The network interfaces 240 may include various devices for interfacing the computing architecture 200 with one or more types of servers, computer systems, and communication systems, such as a network interface adaptor as is known in the art. The network interfaces 240 may include devices for communicating between and among the network device 120, the IQ services 130, the performance testing services 140, the data repository 150, the batch analytics module 160, and the like over the network(s) 110, for example.

In some embodiments, each component of the computing architecture 200 as shown may include multiple components on multiple computer systems of a network. For example, the computing architecture 200 may comprise servers, such as application servers, file servers, database servers, web servers, etc., for performing various functions described herein. The servers of the computing architecture 200 may for example be physically separate computer servers or virtual servers hosted in a virtual environment, among other implementations. In further embodiments, one or more components of the computing architecture 200 may be combined in a single physical component. For example, the processing resources 210, the memory 220, the network interfaces 240, and the system bus 250 may be combined in a single system-on-a-chip ("SoC") implementation. It will be appreciated that the network device 120, the servers, and/or other computing resources of the configuration optimization system 100 may not include all of the components shown in FIG. 2, may include other components that are not explicitly shown in FIG. 2, or may utilize an architecture completely different than that shown in FIG. 2.

FIG. 3 shows an example of one method 300 for automatically optimizing QoS configuration in networking equipment, according to some embodiments of the present disclosure. The method 300 may be utilized by a newly deployed network device 120, such as an Internet router, to automatically have the QoS functions 122 optimally configured to the existing Internet connection link constraints to prevent link saturation and therefore minimize the occurrence of bufferbloat. For example, a user installing the network device 120 may initiate a user interface that walks them through the installation, configuration, and optimization process.

The method 300 may also be initiated automatically by the network device 120 on a periodic basis to collect performance measures and adjust the configuration of the QoS functions to ensure optimal settings even if line speed and quality of the connection vary across the time of day. For example, streaming video is generally affected by congestion in Internet service provider ("ISP") networks, typically at peak times in the evening hours, necessitating re-adjustment of the QoS configuration settings during those periods to maintain optimum performance. The scheduler 128 of the network device 120 may be configured to periodically initiate the method 300 in order to apply optimal QoS settings to the device during these periods.

Figure 3A:
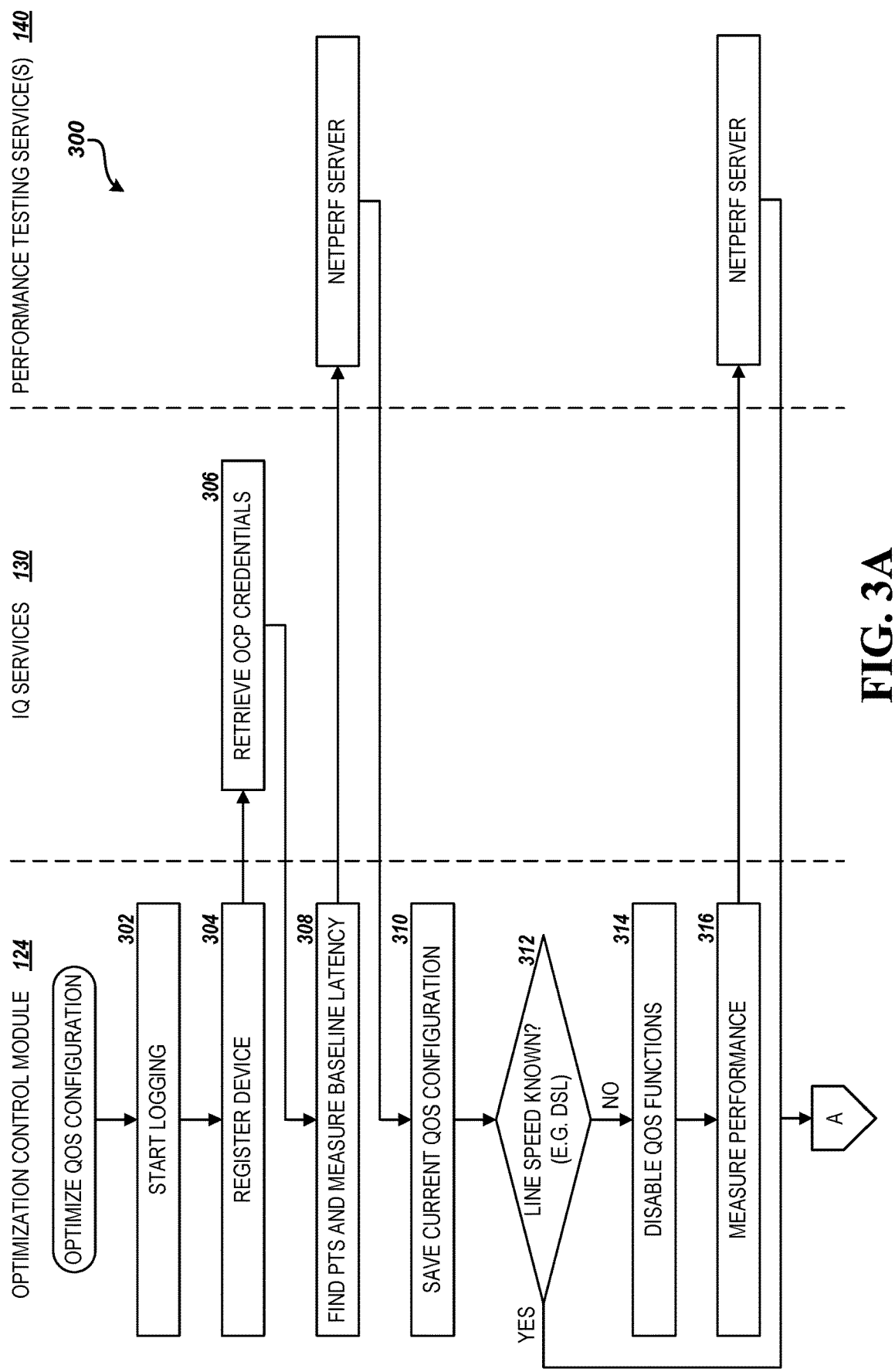
FIGS. 3A-3C are a flow diagram illustrating one method for automatically optimizing QoS configuration in networking equipment, according to some embodiments of the present disclosure.
Figure 3B:
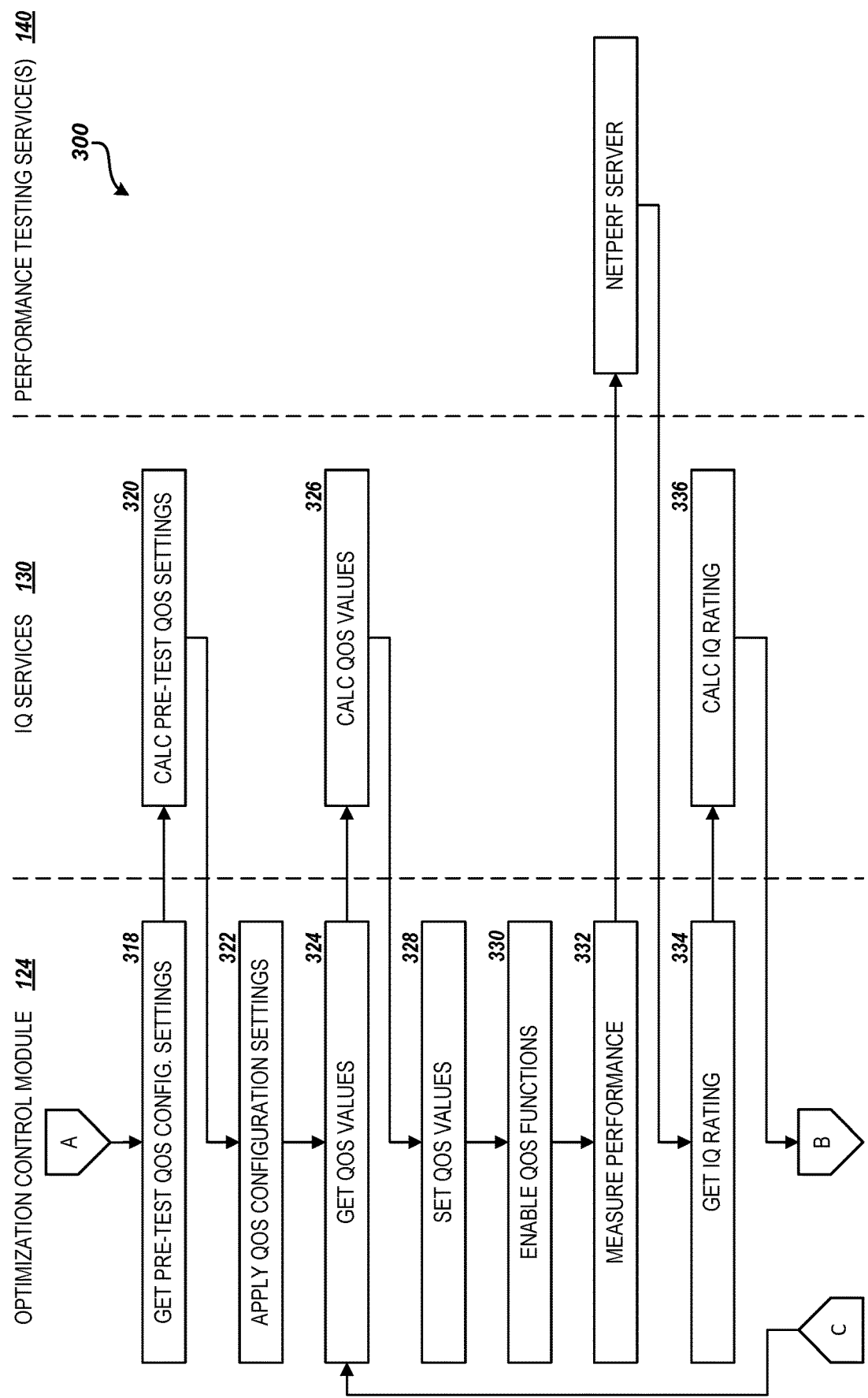
Figure 3C:
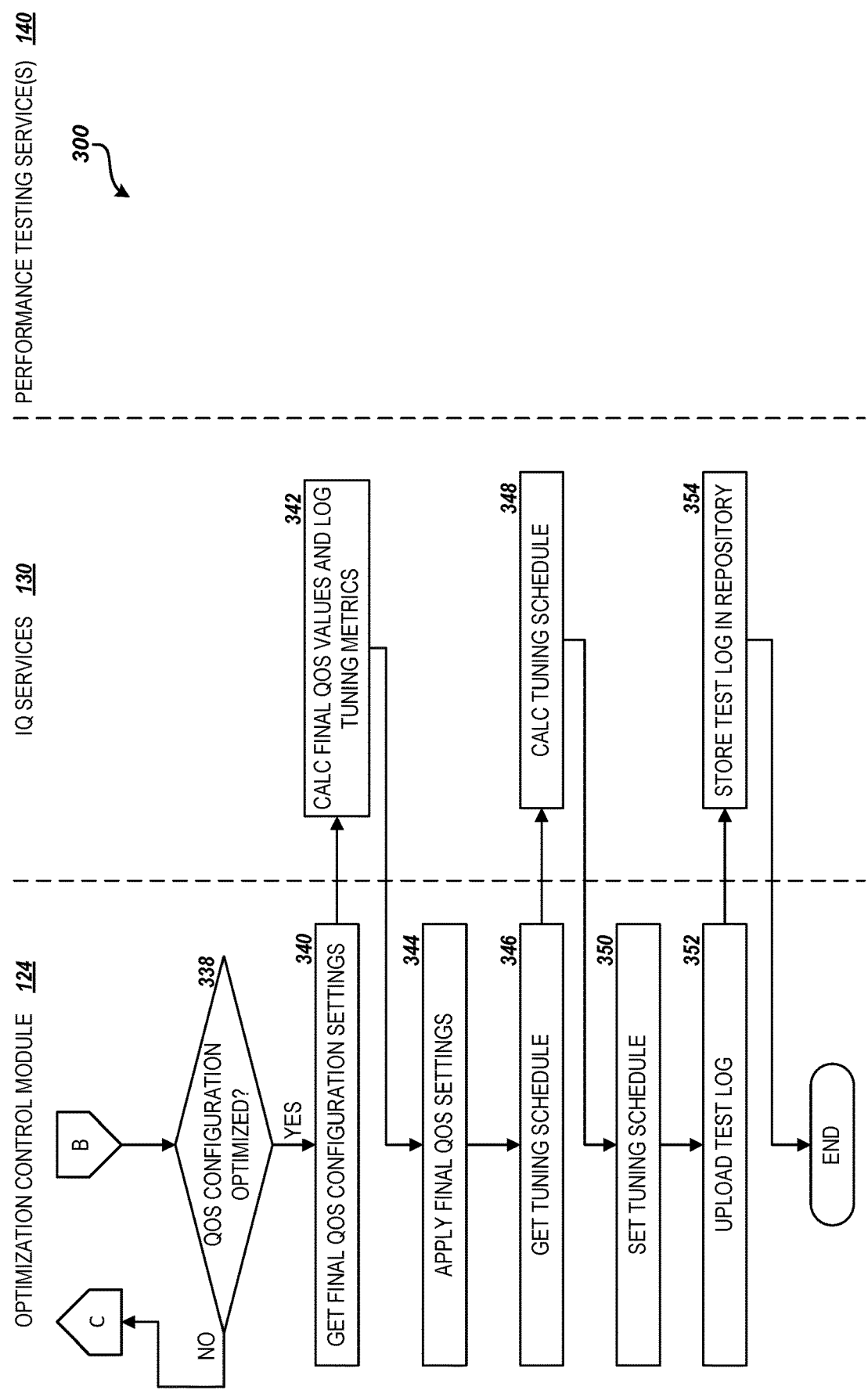

According to some embodiments, the method 300 may be implemented by the optimization control module 124 executing on the network device in conjunction with the IQ services 130 and performance testing service(s) 140 available across the network(s) 110, as shown in FIGS. 3A-3C. For example, the method 300 may be embodied in the optimization control process script 125 and/or the optimization adjustment script 126 on the network device 120. In other embodiments, the method 300 may be implemented by various other modules, services, scripts, or components of the configuration optimization system 100.

The method 300 begins at step 302, where the optimization control module 124 initiates logging of the optimization process. Next, at step 304, the optimization control module 124 registers the device with the IQ services 130. For example, the optimization control module 124 may call the registration service 132 to retrieve the credentials for subsequent calls to the IQ services 130. The IQ services 130 retrieve the credentials, as shown at 306, and passes them back to the optimization control module 124. In the case of an initial call of network device 120 to the IQ services 130, the registration service 132 may generate credentials for the device and perform other initialization functions. In addition, the optimization control module 124 may call the pre-test component update service 133 to ensure the network device has the latest version of the firmware, extensions, and/or shell scripts before executing the test.

From step 306, the method 300 proceeds to step 308, where the optimization control module 124 locates a performance testing service 140 to utilize as a target for performance testing and measures a baseline latency to the selected performance testing service. This may be accomplished by pinging the server hosting the netperf service multiple times and averaging the round trip times, for example. Next at step 310 the current QoS configuration is saved in case the testing halts mid-process and the QoS configuration must be restored.

At shown at step 312, if the line speed of the connection is known (e.g., for a DSL connection), then the method 300 proceeds to step 318 as shown in FIG. 3B. If the line speed is not known, then the method proceeds from step 312 to step 314, where the optimization control module 124 disables the QoS functions 122 on the network device 120 and then initiates performance testing to measure connection speed, line quality, and other performance measures against the selected performance testing service 140, as shown at step 316. In some embodiments, performance testing may take into consideration other network traffic flowing through the network device 120 as well, such as downloads taking place, in addition to the communication with the selected performance testing service 140.

Next, at step 318, the optimization control module 124 gets the initial QoS configuration settings for performing the testing from the IQ services 130. For example, the optimization control module 124 may call the retrieve pre-test QoS configuration API of the CQP services 134 to get the initial QoS configuration settings based on the connection type and/or protocol. The CQP service 134 calculates the pre-test QoS configuration settings, as shown at step 320, and returns them to the optimization control module 124. At step 322, the optimization control module 124 applies the retrieved QoS configuration settings to the QoS functions 122 of the networking device. According to some embodiments, the CQP service 134 may return QoS configuration settings as a series of standard configuration commands to be executed by the firmware of the network device 120. For example, the CQP service 134 may return a series of commands based on the Unified Configuration Interface ("UCI") implemented in OpenWRT®. To apply the QoS configurations settings, the optimization control module 124 simply executes the commands through the UCI of the firmware and logs the results.

Next, at step 324, the optimization control module 124 calls the calculate QoS API of the CQP service 134 to retrieve optimal QoS values based on the provided performance measurements of the connection of the network device 120 to the network(s) 110, such as latency, line speed (up and down), and the like in addition to other properties of the connection, such as connection type, (DSL, VDSL, cable, etc.), connection protocol (PPPoE, DHCP, etc.), and the like. The CQP service 134 calculates the optimal QoS values based on the provided performance measurements at step 326, and returns them to the optimization control module 124. At step 328, the optimization control module 124 applies the QoS values to the QoS functions 122 in the network device and enables the QoS functions, as shown at step 330.

From step 330, the method 300 proceeds to step 332, where optimization control module 124 again initiates performance testing to measure connection speed, line quality, and other performance measures against the selected performance testing service 140 using the optimal QoS configuration settings and values. Next, at step 334, the optimization control module 124 calls the calculate IQ rating API of the CQP service 134 to retrieve the IQ rating calculated for the configured QoS functions 122 based on the performance measurements from the performance testing. The CQP service 134 calculates the IQ rating based on the provided performance measures, and returns the rating to the optimization control module 124. Next, the CQP service 134 and/or the optimization control module 124 determine whether additional optimization is required based on the IQ rating, as shown at step 338 in FIG. 3C. For example, the IQ rating may be compared to a threshold value to determine if additional optimization is to be performed.

If the QoS configuration is not optimal, then the method 300 returns to step 324 in FIG. 3B, where the optimization control module 124 calls the calculate QoS API of the CQP service 134 to retrieve new optimal QoS values based on the last performance measurements and the process is repeated until the QoS configuration is optimal. In other embodiments, if the CQP service 134 determines the QoS configuration is not optimal, it may return new QoS values with the IQ rating which may then be applied to the QoS functions 122 and the process repeated. Once optimal QoS configuration settings have been achieved, the method 300 proceeds from step 338 to step 340, where the optimization control module 124 requests final QoS configuration settings from the IQ services 130. For example, the optimization control module 124 may call the retrieve post-test QoS configuration API of the CQP service 134 to retrieve post-test QoS configuration settings after optimization for final configuration settings for the QoS functions 122. The CQP service 134 calculates the final QoS configuration settings at step 342 and returns them to the optimization control module 124. In addition, the CQP service may save the provided tuning metrics in the data repository 150 for future batch analytics, as described herein.

At step 344, the optimization control module 124 applies the final QoS configuration settings to the QoS functions 122 of the network device 120 and then requests tuning schedule(s) from the IQ services 130 for future runs of the optimization process, as shown at step 346. For example, the optimization control module 124 may call the retrieve tuning schedule API of the CQP service 134 to retrieve one or more schedules for performing periodic optimization of the QoS functions 122 of the network device 120 as well as other tuning operations. In some embodiments, the CQP service 134 calculates the schedule(s) based on historical tuning metrics stored in the data repository 150 and batch analytics, as described herein, and returns the schedules to the optimization control module 124. The optimization control module 124 may then apply the retrieved schedule(s) to the optimization and tuning processes through the scheduler 128 of the network device 120, as shown at step 350.

The method proceeds from step 350 to step 352, where the optimization control module 124 uploads the test log for the optimization process to the IQ services 130. For example, the optimization control module 124 may call the upload log file API of the CQP service 134 with the log file contents, and the CQP service may store the log file contents in the data repository 150, as shown at step 354. As described herein, the test log may be utilized with other tuning metrics by the batch analytics module 160 for continued analytics and optimization. From step 354, the method 300 ends.

Other embodiments may include additional options or may omit certain options shown herein. One should note that conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method of optimizing router Quality of Service ("QoS") functions of an Internet router comprising the steps of:
   disabling, by the Internet router, the router QoS functions on the Internet router;
   determining, by the Internet router, performance measurements for a network connection of the Internet router;
   calling, by the Internet router, a remote web service over the network connection passing one or more of a connection type and a protocol of the network connection to the remote web service;
   computing, by the remote web service, initial QoS configuration settings for the router QoS functions of the Internet router based at least in part on the passed one or more of a connection type and a protocol of the network connection, the QoS functions allowing the Internet router to manage network traffic through the network connection;
   receiving, by the Internet router, the computed initial QoS configuration settings from the remote web service;
   configuring, by the Internet router, the router QoS functions utilizing the received initial QoS configuration settings;
   sending, by the Internet router, the performance measurements to the remote web service over the network connection;
   receiving, by the remote web service, the performance measurements from the Internet router;
   computing, by the remote web service, optimal QoS values for the router QoS functions based on the received performance measurements, the optimal QoS values comprising a QoS upload speed and a QoS download speed for the network connection;
   returning, by the remote web service, the computed optimal QoS values to the Internet router;
   configuring, by the Internet router, the router QoS functions utilizing the computed optimal QoS values; and
   uploading, by the Internet router, metrics regarding the Internet router to the remote web service, wherein the remote web service is configured to store uploaded metrics for multiple timestamp values in a database and periodically compute optimal QoS values for the router QoS functions for a plurality of periods during a day based on the uploaded metrics in the database.

2. The method of claim 1, further comprising the steps of:
   upon configuring the router QoS functions utilizing the computed optimal QoS values, re-measuring by the Internet router, performance of the network connection with the configured router QoS functions to determine new performance measurements;
   re-sending, by the Internet router, the new performance measurements for the network connection to the remote web service; and
   calculating, by the remote web service, a rating for the configured router QoS functions of the Internet router based on the new performance measurements for the network connection;
   determining, by the remote web service, whether the rating indicates that the configured router QoS functions are optimized; and
   upon determining that the configured router QoS functions are not optimized, repeating the computing, returning, applying, re-measuring, re-sending, and calculating steps until the rating indicates the configured router QoS functions are optimized.

3. The method of claim 1, wherein the method is performed upon initialization of the Internet router after being installed in a network.

4. The method of claim 2, wherein the computing, returning, applying, re-measuring, re-sending, and calculating steps are repeated on a periodic basis according to a schedule provided by the remote web service to the Internet router over the network connection.

5. The method of claim 1, wherein the performance measurements comprise one or more of network latency and line speed.

6. The method of claim 1, wherein the initial QoS configuration settings comprise one or more standard configuration commands and wherein configuring the router QoS functions utilizing the initial QoS configuration settings comprises executing the one or more standard configuration commands through a firmware of the Internet router.

7. The method of claim 1, wherein the performance measurements sent to the remote web service include current line statistics read by the Internet router from an attached modem or WAN interface.

8. The method of claim 1, wherein determining performance measurements for the network connection comprises:
   communicating with remote performance testing services across the network connection.

9. The method of claim 1, wherein the router QoS functions allow the Internet router to manage the network traffic utilizing one or more of packet prioritization, resource reservation, and queue management.

10. A non-transitory computer-readable storage medium comprising processor-executable instructions that, when executed by a processing resource of an Internet router, cause the router to:
   disable router QoS functions of the Internet router;
   communicate with a performance testing service over the Internet to measure performance measurements for a connection of the router to the Internet;
   call a cloud-based web service over the Internet passing one or more of a connection type and a protocol of the connection, wherein the cloud-based web service computes initial Quality of Service ("QoS") configuration settings for the router based at least in part on the passed one or more of a connection type and a protocol of the connection;
   receive the computed initial QoS configuration settings from cloud-based web service;

configure router QoS functions of the router using the received initial QoS configuration settings, the router QoS functions allowing the router to manage network traffic through the connection;

send the performance measurements to the cloud-based web service, wherein the cloud-based web service computes optimal QoS values for the router based on the performance measurements for the connection, the optimal QoS values comprising a QoS upload speed and a QoS download speed for the network connection;

receive the computed optimal QoS values from the cloud-based web service;

configure the router QoS functions using the computed optimal QoS values; and upload metrics regarding the Internet router to the remote web service, wherein the remote web service is configured to store uploaded metrics for multiple timestamp values in a database and periodically compute optimal QoS values for the router QoS functions for a plurality of periods during a day based on the uploaded metrics in the database.

11. The computer-readable storage medium of claim 10, containing further processor-executable instructions that cause the router to repeat the measuring, sending, receiving, and applying instructions until it is determined that the configured router QoS functions are optimized for the connection.

12. The computer-readable storage medium of claim 10, containing further processor-executable instructions that cause the router to:

receive a schedule from the cloud-based web service, the schedule specifying a periodic basis for performing the instructions; and performing the measuring, sending, receiving, and applying instructions on the periodic basis according to the schedule.

13. The computer-readable storage medium of claim 10, wherein the initial QoS configuration settings comprise one or more standard configuration commands and wherein configuring the router QoS functions using the initial QoS configuration settings comprises executing the one or more standard configuration commands through a firmware of the router.

14. The computer-readable storage medium of claim 10, wherein the instructions comprise scripts, the scripts being executed by a scheduler of a firmware of the router.

15. A system comprising:

at least one performance testing service executing on a network;

a network router operably connected to the network by a network connection and comprising a firmware, router Quality of Service "QoS" functions, and an optimization control module configured to disable the router QoS functions, determine performance measurements for the network connection utilizing the at least one performance testing service, call a web service to retrieve initial QoS configuration settings for the router QoS functions, passing one or more of a connection type and a protocol of the network connection to the web service, receive one or more configuration commands from the web service related to the initial QoS configuration settings for the router QoS functions, execute the one or more configuration commands to configure the router QoS functions, send the performance measurements to the web service over the network, receive optimal QoS values from the web service, the optimal QoS values comprising a QoS upload speed and a QoS download speed for the network connection, configure the router QoS functions using the optimal QoS values, and periodically upload metrics regarding the network router to the web service; and the web service executing on a server computer on the network and configured to compute the initial QoS configuration settings for the router QoS functions based on the passed one or more of the connection type and the protocol of the network connection, return the one or more configuration commands related to the initial QoS configuration settings to the network router, receive the performance measurements from the network router, compute the optimal QoS values based on the received performance measurements, return the optimal QoS values to the network router, and store the uploaded metrics for multiple timestamp values in a database and periodically compute optimal QoS values for the router QoS functions for a plurality of periods during a day based on the uploaded metrics in the database.

16. The system of claim 15, wherein the web service is further configured to:

calculate a rating for the configured router QoS functions based on the received performance measurements;

determine whether the rating indicates that the configured router QoS functions are optimized; and upon determining that the configured router QoS functions are not optimized, notify the network router, the optimization control module being further configured to, upon receiving notification that the router QoS functions are not optimized, repeat the determining, sending, receiving optimal QoS values, and applying until the rating indicates the configured router QoS functions are optimized.

17. The system of claim 15, wherein the network router further comprises a scheduler, and wherein the determining, sending, receiving optimal QoS values, and applying are initiated by the scheduler on a periodic basis according to a schedule provided by the web service.

* * * * *